(12) United States Patent
Chen et al.

(10) Patent No.: US 11,630,317 B2
(45) Date of Patent: Apr. 18, 2023

(54) SCANNING CAMERA-FREE DEFOCUSING MEASUREMENT COLLIMATOR

(71) Applicants: Zhongfei Chen, Guangdong (CN); Minglin He, Guangdong (CN); Shuaitian Jiang, Guangdong (CN); Jianzhi Song, Guangdong (CN); Deyu Li, Guangdong (CN)

(72) Inventors: Zhongfei Chen, Guangdong (CN); Minglin He, Guangdong (CN); Shuaitian Jiang, Guangdong (CN); Jianzhi Song, Guangdong (CN); Deyu Li, Guangdong (CN)

(73) Assignee: Shenzhen General Core Optoelectronics Co., Ltd., Shenzhen (CN)

( * ) Notice: Subject to any disclaimer, the term of this patent is extended or adjusted under 35 U.S.C. 154(b) by 0 days.

(21) Appl. No.: 18/046,159

(22) Filed: Oct. 13, 2022

(65) Prior Publication Data

US 2023/0056510 A1    Feb. 23, 2023

(30) Foreign Application Priority Data

Aug. 17, 2022   (CN) .......................... 202210989422.0

(51) Int. Cl.
*G02B 27/30*    (2006.01)
*G02B 13/00*    (2006.01)

(52) U.S. Cl.
CPC ........... *G02B 27/30* (2013.01); *G02B 13/003* (2013.01)

(58) Field of Classification Search
CPC .............................. G02B 27/30; G02B 13/003
See application file for complete search history.

(56) References Cited

U.S. PATENT DOCUMENTS 7,826,593 B2   11/2010 Svensson et al.
9,324,468 B2   4/2016 Mansfield et al.

*Primary Examiner* — Jack Dinh

(57) ABSTRACT

A collimator includes a front lens sleeve, a clamping groove disposed on the front lens sleeve, a linking sleeve fastened on the clamping groove, a snapping groove disposed on the linking sleeve distal the front lens sleeve, a connection sleeve slidably connected to the snapping groove, a constraint sleeve disposed on the snapping groove, and a limit groove disposed on an inner surface of the constraint sleeve. The components cooperate with each other. The test chart is tilted relative to the optical axis of the lens and makes the test chart distributed at different distances along the axis. When using the camera to shoot the collimator, the clarity of different components reflects the relative focus position of the camera so as to detect the vehicle mounted camera.

10 Claims, 8 Drawing Sheets

SCANNING CAMERA-FREE DEFOCUSING MEASUREMENT COLLIMATOR

FIELD OF THE INVENTION

The invention relates to photoelectric performance tests, and more particularly to a scanning camera-free defocusing measurement collimator.

BACKGROUND OF THE INVENTION

China is developing very rapidly in recent years. All walks of life in China have sprung up like mushrooms. In particular, the rapid development of the photoelectric industry has greatly improved the people's living standards in China. At the same time, more and more requirements have followed, and the photoelectric industry has become wider and wider. In order to meet the requirements for the shooting effects of all walks of life and various environments, the types of vehicle mounted cameras are also changing with each passing day. Now the common detection devices can no longer meet the accuracy measurement of the wide range of vehicle cameras. Therefore, the detection products for special vehicle mounted cameras emerge as the times require. The vehicle mounted camera, known as the "eye of automatic driving", is the core sensing device in the ADAS system and the field of automatic driving. It mainly collects image information through the lens and image sensor to achieve 360-degree visual perception and make up for the defects of radar in object recognition. It is the device closest to human vision. The vehicle mounted camera can display video and audio in real time, providing a more scientific basis for handling and positioning traffic accidents, and fully guaranteeing our property and personal safety. The vehicle mounted camera is widely used in the automotive field, from the early use of driving records, reversing images, parking and looking around to the behavior recognition and ADAS assisted driving in the intelligent cabin. The number of its application scenarios is becoming more and more.

The vehicle mounted camera mainly comprises a focus, an automatic aperture lens and a zoom lens, in which the size of the focus determines the size of the field of view. When the focal length is small and the field of view is large, the observation range is large, but the resolution of objects far away is not very clear. When the focal length is large and the field of view is small, the observation range is small, and objects far away can be seen clearly. The automatic aperture lens is video driven. The lens itself contains an amplifier circuit to convert the video amplitude signal from the camera into the control of the aperture motor. The DC drive type uses the DC voltage on the camera to directly control the aperture. The zoom lens is a manual type or an electric type. The manual zoom lens is generally used in scientific research projects rather than in the closed-circuit monitoring system. The advantage of the electric lens is that the zoom range is large, in which a wide range of situations can be observed, and a specific detail can be focused.

However, the typical processing devices have the following defects: most of the existing detection devices change the relative position of the test chart and the lens through the motor to find the best imaging distance to measure the best focal plane position of the camera. The relevant system of this method is complex, and scanning is required during measurement, which greatly prolongs the whole measurement time and cannot meet the requirement of shortening the production (measurement) cycle in industrial production.

Thus, the need for improvement still exists.

SUMMARY OF THE INVENTION

The invention aims to provide a scanning camera-free defocusing measurement collimator. The structural parts of the invention cooperate with each other. The test chart is placed in a tilted way relative to the optical axis of the lens, and the specially designed test chart makes the special structure of the test chart distributed at different distances along the axis. When using the camera to shoot the collimator, the clarity of different structures can reflect the relative focus position of the camera, so that the device can detect the special vehicle mounted camera, which solves the problem in the prior art.

For the purpose above, the invention provides the following technical solution: a scanning camera-free defocusing measurement collimator, which comprises a front lens sleeve, a clamping groove disposed on the surface of the front lens sleeve, a linking sleeve fastened on the surface of the front lens sleeve with the clamping groove, a snapping groove disposed on the side of the linking sleeve far from the front lens sleeve, a connection sleeve connected on the surface of the snapping groove in a sliding way, a constraint sleeve disposed on the surface of the snapping groove, a limit groove disposed on the inner surface of the constraint sleeve, a limit sleeve fastened on the inner surface of the constraint sleeve on the limit groove and a tail sleeve fastened on the inner surface of the limit sleeve.

A positioning ring is connected to the inner surface of the front lens sleeve, a convex lens urges against the inner surface of the front lens sleeve and against the surface of the positioning ring, and a concave lens urges against the inner surface of the front lens sleeve and against the surface of the convex lens. The structural parts of the invention cooperate with each other. The test chart is placed in a tilted way relative to the optical axis of the lens, and the specially designed test chart makes the special structure of the test chart distributed at different distances along the axis. When using the camera to shoot the collimator, the clarity of different structures can reflect the relative focus position of the camera, so that the device can detect the special vehicle mounted camera. In the novel collimator, the test chart is placed in a tilted way relative to the optical axis of the lens, and the specially designed test chart makes the special structure (pattern) of the test chart distributed at different distances along the axis. When using the camera to shoot the collimator, the clarity of different structures can reflect the relative focus position of the camera. Through the special design of the placement angle of the test chart and the one of the test chart structure, when the system is used for measurement, no scanning is required, which greatly improves the measurement speed, and makes the system simple and greatly reduces the cost. In addition, the tilted angle of the test chart and the special structure of the test chart are made according to the calculation result of the camera and lens parameters. The invention facilitates the detection of the vehicle mounted camera, thereby reducing the detection difficulty, and improving the detection efficiency and the detection convenience of the detection device for vehicle mounted camera.

Preferably, the connection sleeve urges against the surface of the constraint sleeve, the limit ring is connected to the inner surface of the constraint sleeve, an assembly sleeve urges against the inner surface of the constraint sleeve, and the limit ring urges against the outer surface of the assembly sleeve. The limit ring limits the position of the assembly sleeve, thereby reducing the offset probability of the assembly sleeve and improving the stability of the assembly sleeve.

Preferably, an installation groove is disposed on the inner surface of the surface of the assembly sleeve, a tilted test chart is connected to the inner surface of the assembly sleeve located in the installation groove and is disposed at an angle of 45-degree, the tilt spacing of the graphics of the tilted test chart is 2 mm, a sealing ring is connected to the inner surface of the constraint sleeve, and the assembly sleeve urges against the outer surface of the sealing ring. The installation groove on the inner surface of the assembly sleeve can be used to install the tilted test chart, so as to fix the position of the tilted test chart and achieve the transmission effect of the tilted test chart.

Preferably, a light source lens urges against the inner surface of the limit sleeve, the constraint sleeve urges against the inner surface of the limit sleeve, an LED light source plate urges against the inner surface of the limit sleeve, a binding ring urges against the inner surface of the limit sleeve, and an isolation groove is connected to the surface of the binding ring.

Preferably, the constraint sleeve urges against the outer surface of the light source lens, the LED light source plate urges against the outer surface of the constraint sleeve, the constraint ring urges against the surface of the LED light source plate, and the isolation groove urges against the inner surface of the limit sleeve. The LED light source plate provides light to the device to improve the photography imaging effect of the device, thus improving the clarity of the device. The invention is small in size, and convenient for building mechanism test, and has high universality. Its brightness of the light source can be adjusted to enhance the applicability of the product. LED supplementary lighting is adopted, with stable performance and long service life. The overall product is in a metal structure, which is stable and doesn't deform. In addition, the invention is simple and not complex to use, saving measurement time and improving efficiency. The specially designed card placement angle and the specially designed card structure make it possible to use this system for measurement without any scanning, thus greatly improving the measurement speed, making the system change simple and greatly reducing the cost. The tilt angle of the graphics card and the special structure on the graphics card are calculated according to the camera and lens parameters. Through the special design of the placement angle of the test chart and the one of the test chart structure, when the system is used for measurement, no scanning is required, which greatly improves the measurement speed, and makes the system simple and greatly reduces the cost. In addition, the tilted angle of the test chart and the special structure of the test chart are made according to the calculation result of the camera and lens parameters.

Preferably, an end cap is fastened on the inner surface of the tail sleeve, and the tail sleeve urges against the outer surface of the isolation groove. The tail sleeve supports and fixes the position of the end cap, and cooperates with the end cap to seal the tail of the device, so that the device can form a closed state.

Preferably, a wire is connected to the inner surface of the tail sleeve, and a plug is connected to the input end of the wire. A circular hole is disposed on the surface of the end cap. The wire urges against the inner surface of the circular hole and runs through the circular hole. The LED light source plate is electrically connected with the output end of the wire. The wire and plug are used to assemble the device on the processing terminal, while the wire provides power to the device.

The invention has the following advantages and benefits in comparison with the conventional art:

In the novel collimator of the invention, the test chart is placed in a tilted way relative to the optical axis of the lens, and the specially designed test chart makes the special structure (pattern) of the test chart distributed at different distances along the axis. When using the camera to shoot the collimator, the clarity of different structures can reflect the relative focus position of the camera. Through the special design of the placement angle of the test chart and the one of the test chart structure, when the system is used for measurement, no scanning is required, which greatly improves the measurement speed, and makes the system simple and greatly reduces the cost. In addition, the tilted angle of the test chart and the special structure of the test chart are made according to the calculation result of the camera and lens parameters. The invention facilitates the detection of the vehicle mounted camera, thereby reducing the detection difficulty, and improving the detection efficiency and the detection convenience of the detection device for vehicle mounted camera.

The invention is small in size, and convenient for building mechanism test, and has high universality. Its brightness of the light source can be adjusted to enhance the applicability of the product. LED supplementary lighting is adopted, with stable performance and long service life. The overall product is in a metal structure, which is stable and doesn't deform. In addition, the invention is simple and not complex to use, saving measurement time and improving efficiency. Through the special design of the placement angle of the test chart and the one of the test chart structure, when the system is used for measurement, no scanning is required, which greatly improves the measurement speed, and makes the system simple and greatly reduces the cost. In addition, the tilted angle of the test chart and the special structure of the test chart are made according to the calculation result of the camera and lens parameters.

The above and other objects, features and advantages of the invention will become apparent from the following detailed description taken with the accompanying drawings

DETAILED DESCRIPTION OF THE INVENTION

Figure 1:
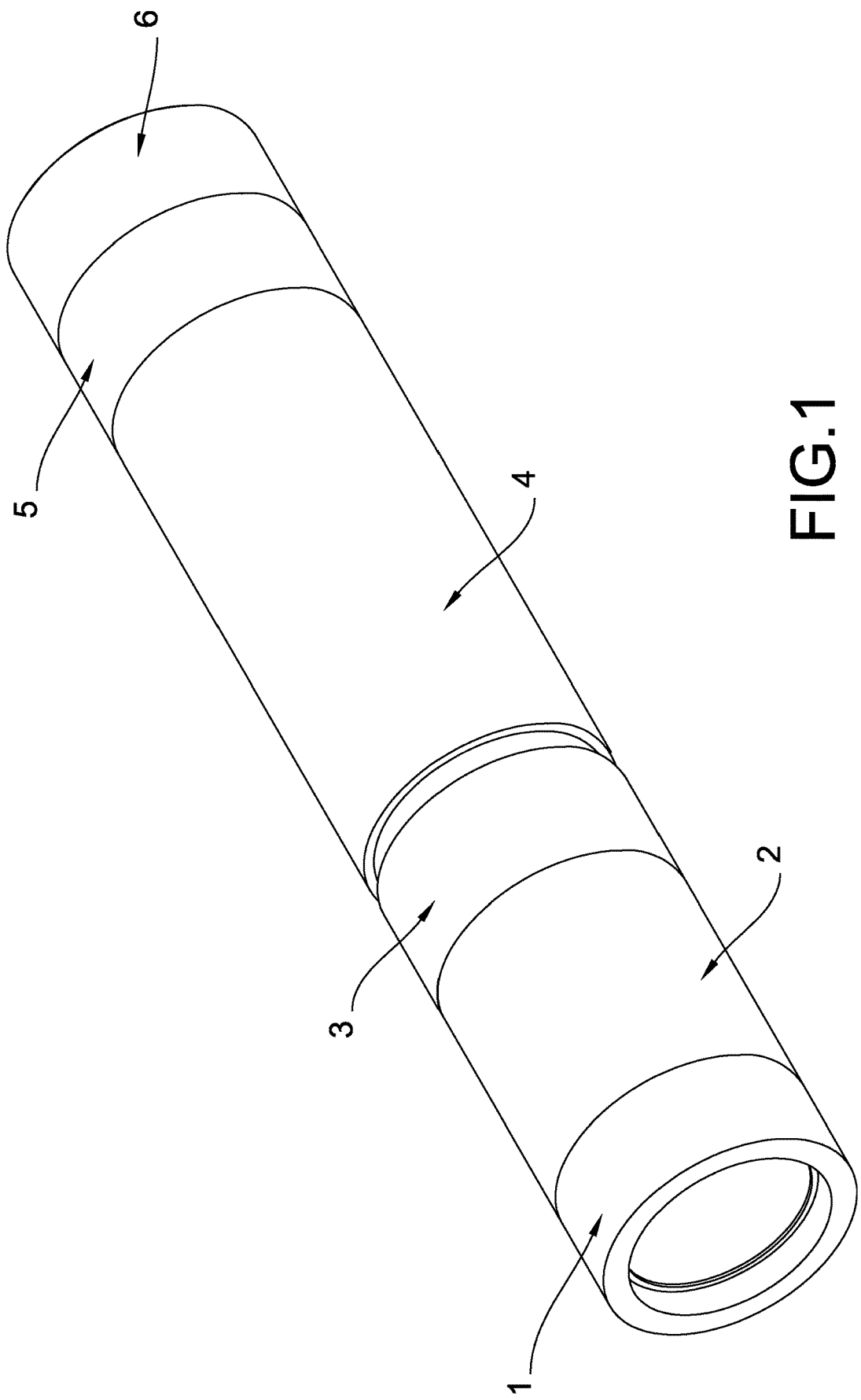
FIG. 1 is a perspective view of a camera-free defocusing measurement collimator of a first preferred embodiment of the invention.

Referring to FIGS. 1 to 3 and 5 to 8, a camera-free defocusing measurement collimator of a first preferred embodiment of the invention comprises a front lens sleeve 1, a clamping groove 100 disposed on the surface of the front lens sleeve 1, a linking sleeve 2 fastened on the clamping groove 100, a snapping groove 23 disposed on the linking sleeve 2 far from the front lens sleeve 1, a connection sleeve 3 slidably disposed on the snapping groove 23, a constraint sleeve 4 partially disposed on the snapping groove 23, a limit groove 40 disposed on an inner surface of the constraint sleeve 4, a limit sleeve 5 fastened on an inner surface of the limit groove 40, and a tail sleeve 6 fastened on an inner surface of the limit sleeve 5.

Figure 2:
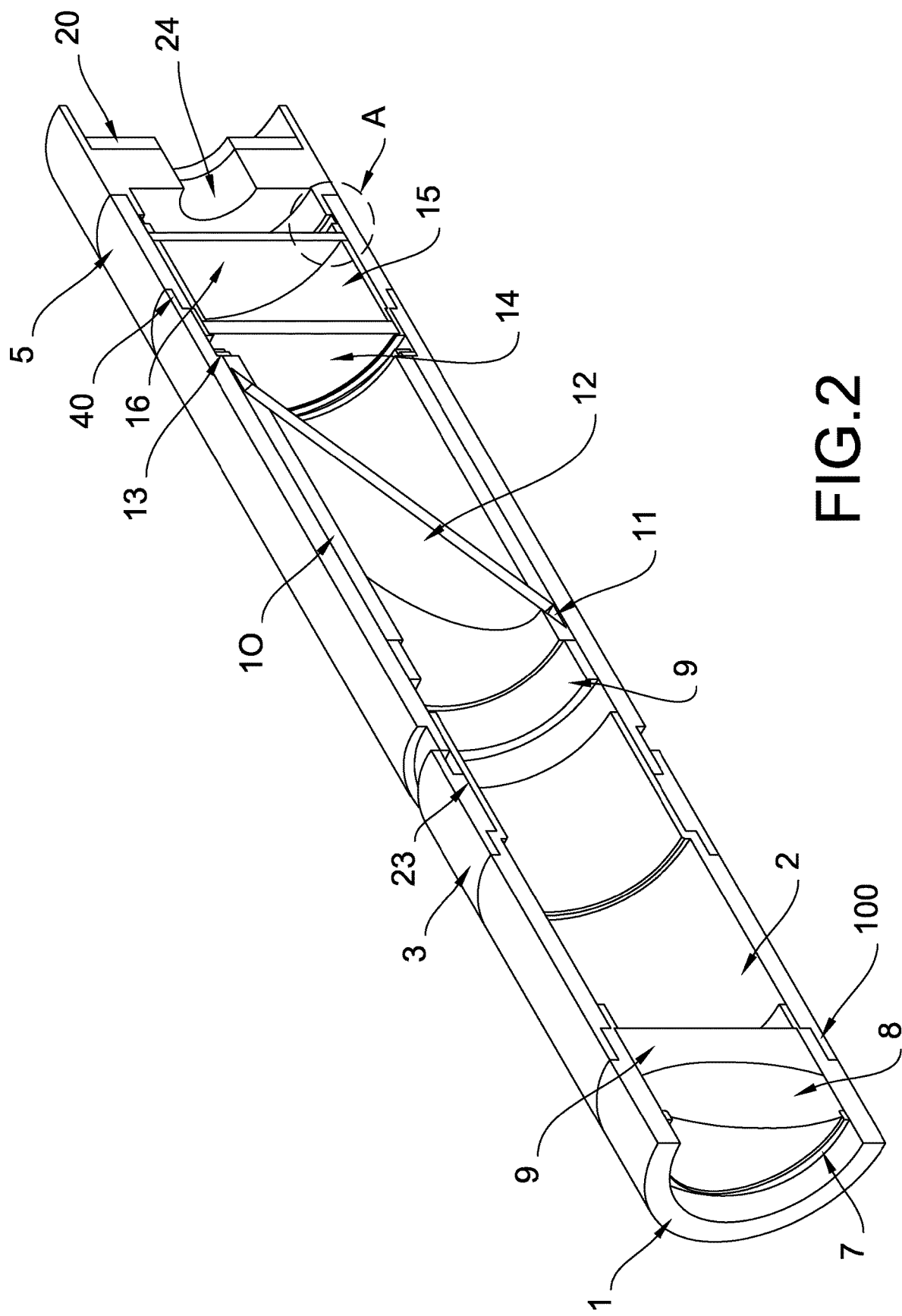
FIG. 2 is a broken-away perspective view of the camera-free defocusing measurement collimator.
Figure 3:
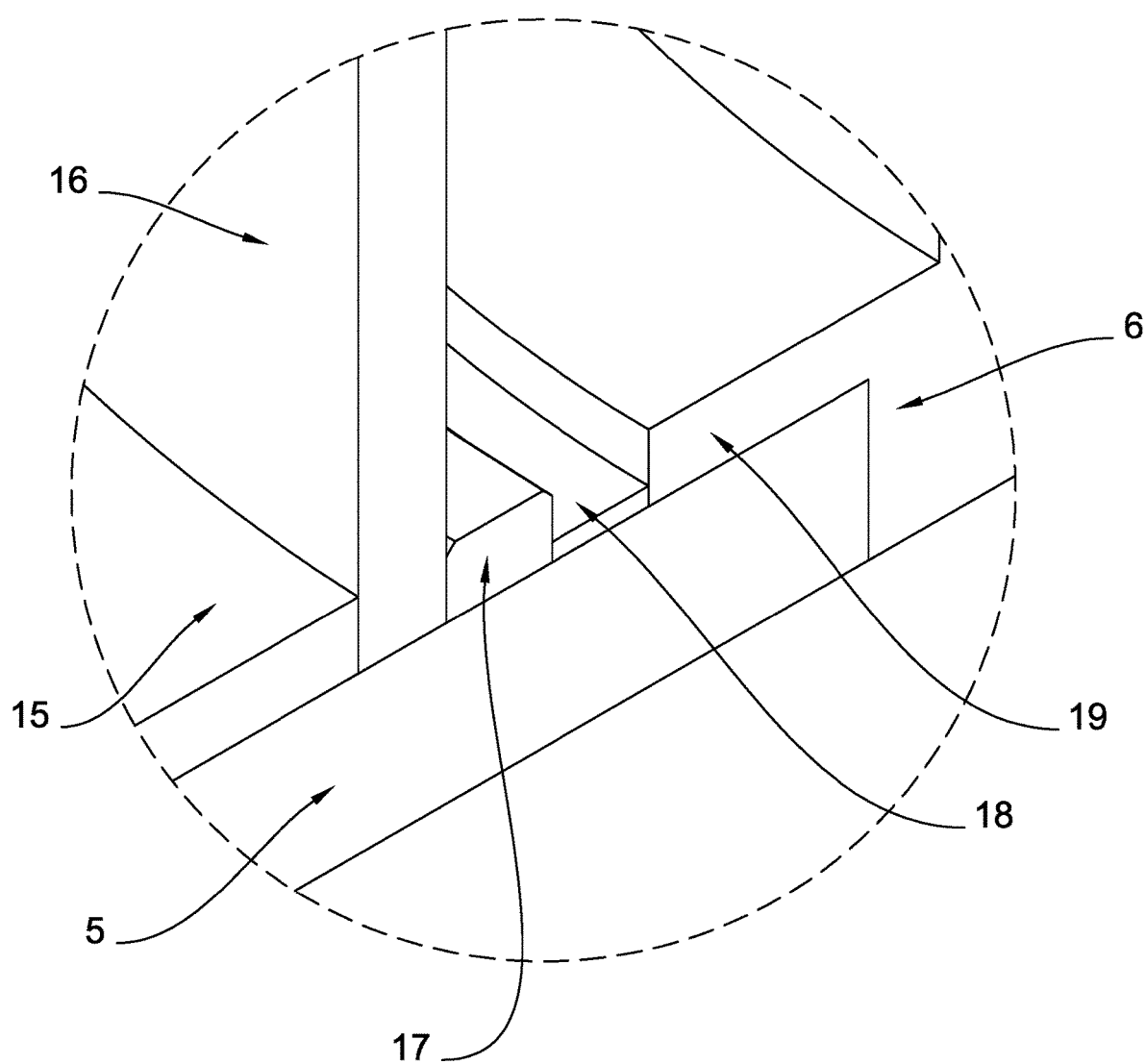
FIG. 3 is a detailed view of the area in circle A in FIG. 2.

As shown in FIGS. 2 to 3 specifically, a positioning ring 7 is connected to the inner surface of the front lens sleeve 1, a convex lens 8 urges against the inner surface of the front lens sleeve 1 and against the surface of the positioning ring 7, and a concave lens 9 urges against the inner surface of the front lens sleeve 1 and against the surface of the convex lens 8. The structural parts of the invention cooperate with each other. The test chart is placed in a tilted way relative to the optical axis of the lens, and the specially designed test chart makes the special structure of the test chart distributed at different distances along the axis. When using the camera to shoot the collimator, the clarity of different structures can reflect the relative focus position of the camera, so that the device can detect the special vehicle mounted camera. In the novel collimator, the test chart is placed in a tilted way relative to the optical axis of the lens, and the specially designed test chart makes the special structure pattern of the test chart distributed at different distances along the axis. When using the camera to shoot the collimator, the clarity of different structures can reflect the relative focus position of the camera. Through the special design of the placement angle of the test chart and the one of the test chart structure, when the system is used for measurement, no scanning is required, which greatly improves the measurement speed, and makes the system simple and greatly reduces the cost. In addition, the tilted angle of the test chart and the special structure of the test chart are made according to the calculation result of the camera and lens parameters (see FIGS. 5-8). The invention facilitates the detection of the vehicle mounted camera, thereby reducing the detection difficulty, and improving the detection efficiency and the detection convenience of the detection device for vehicle mounted camera.

As shown in FIGS. 2 to 3 specifically, the connection sleeve 3 urges against the surface of the constraint sleeve 4, a limit ring 10 is connected to the inner surface of the constraint sleeve 4, an assembly sleeve 11 urges against the inner surface of the constraint sleeve 4, and the limit ring 10 urges against the outer surface of the assembly sleeve 11. The limit ring 10 limits the position of the assembly sleeve 11, thereby reducing the offset probability of the assembly sleeve 11 and improving the stability of the assembly sleeve 11.

As shown in FIGS. 2 to 3 specifically, an installation groove 12 is disposed on the inner surface of the surface of the assembly sleeve 11, a tilted test chart 13 is connected to the inner surface of the assembly sleeve 11 located in the installation groove 12 and is disposed at an angle of 45-degree, the tilt spacing of the graphics of the tilted test chart 13 is 2 mm, a sealing ring 14 is connected to the inner surface of the constraint sleeve 4, and the assembly sleeve 11 urges against the outer surface of the sealing ring 14. The installation groove 12 on the inner surface of the assembly sleeve 11 can be used to install the tilted test chart 13, so as to fix the position of the tilted test chart 13 and achieve the transmission effect of the tilted test chart 13.

As shown in FIGS. 2 to 3 specifically, a light source lens 15 urges against the inner surface of the limit sleeve 5, the constraint sleeve 16 urges against the inner surface of the limit sleeve 5, an LED light source plate 17 urges against the inner surface of the limit sleeve 5, a binding ring 18 urges against the inner surface of the limit sleeve 5, and an isolation groove 19 is connected to the surface of the binding ring 18.

As shown in FIGS. 2 to 3 specifically, the constraint sleeve 16 urges against the outer surface of the light source lens 15, the LED light source plate 17 urges against the outer surface of the constraint sleeve 16, the constraint ring urges against the surface of the LED light source plate 17, and the isolation groove 19 urges against the inner surface of the limit sleeve 5. The LED light source plate 17 provides light to the device to improve the photography imaging effect of the device, thus improving the clarity of the device. The invention is small in size, and convenient for building mechanism test, and has high universality. Its brightness of the light source can be adjusted to enhance the applicability of the product. LED supplementary lighting is adopted, with stable performance and long service life. The overall product is in a metal structure, which is stable and doesn't deform. In addition, the invention is simple and not complex to use, saving measurement time and improving efficiency. The specially designed card placement angle and the specially designed card structure make it possible to use this system for measurement without any scanning, thus greatly improving the measurement speed, making the system change simple and greatly reducing the cost; The tilt angle of the graphics card and the special structure on the graphics card are calculated according to the camera and lens parameters.

As shown in FIGS. 2 to 3 specifically, an end cap 20 is fastened on the inner surface of the tail sleeve 6, and the tail sleeve 6 urges against the outer surface of the isolation groove 19. The tail sleeve 6 supports and fixes the position of the end cap 20, and cooperates with the end cap 20 to seal the tail of the device, so that the device can form a closed state.

As shown in FIGS. 2 to 3 specifically, a positioning ring 7 is connected to the inner surface of the front lens sleeve 1, a convex lens 8 urges against the inner surface of the front lens sleeve 1 and against the surface of the positioning ring 7, and a concave lens 9 urges against the inner surface of the front lens sleeve 1 and against the surface of the convex lens 8. The structural parts of the invention cooperate with each other. The test chart is placed in a tilted way relative to the optical axis of the lens, and the specially designed test chart makes the special structure of the test chart distributed at different distances along the axis. When using the camera to shoot the collimator, the clarity of different structures can reflect the relative focus position of the camera, so that the device can detect the special vehicle mounted camera.

As shown in FIGS. 2 to 3 specifically, the connection sleeve 3 urges against the surface of the constraint sleeve 4, the limit ring 10 is connected to the inner surface of the constraint sleeve 4, an assembly sleeve 11 urges against the inner surface of the constraint sleeve 4, and the limit ring 10 urges against the outer surface of the assembly sleeve 11. The limit ring 10 limits the position of the assembly sleeve 11, thereby reducing the offset probability of the assembly sleeve 11 and improving the stability of the assembly sleeve 11.

As shown in FIGS. 2 to 3 specifically, an installation groove 12 is disposed on the inner surface of the surface of the assembly sleeve 11, a tilted test chart 13 is connected to the inner surface of the assembly sleeve 11 located in the installation groove 12, a sealing ring 14 is connected to the inner surface of the constraint sleeve 4, and the assembly sleeve 11 urges against the outer surface of the sealing ring 14. The installation groove 12 on the inner surface of the assembly sleeve 11 can be used to install the tilted test chart 13, so as to fix the position of the tilted test chart 13 and achieve the transmission effect of the tilted test chart 13.

As shown in FIGS. 2 to 3 specifically, a light source lens 15 urges against the inner surface of the limit sleeve 5, the constraint sleeve 16 urges against the inner surface of the limit sleeve 5, an LED light source plate 17 urges against the inner surface of the limit sleeve 5, a binding ring 18 urges against the inner surface of the limit sleeve 5, and an isolation groove 19 is connected to the surface of the binding ring 18.

As shown in FIGS. 2 to 3 specifically, the constraint sleeve 16 urges against the outer surface of the light source lens 15, the LED light source plate 17 urges against the outer surface of the constraint sleeve 16, the constraint ring urges against the surface of the LED light source plate 17, and the isolation groove 19 urges against the inner surface of the limit sleeve 5. The LED light source plate 17 provides light to the device to improve the photography imaging effect of the device, thus improving the clarity of the device.

An end cap 20 is fastened on the inner surface of the tail sleeve 6, and the tail sleeve 6 urges against the outer surface of the isolation groove 19. The tail sleeve 6 supports and fixes the end cap 20.

Figure 4:
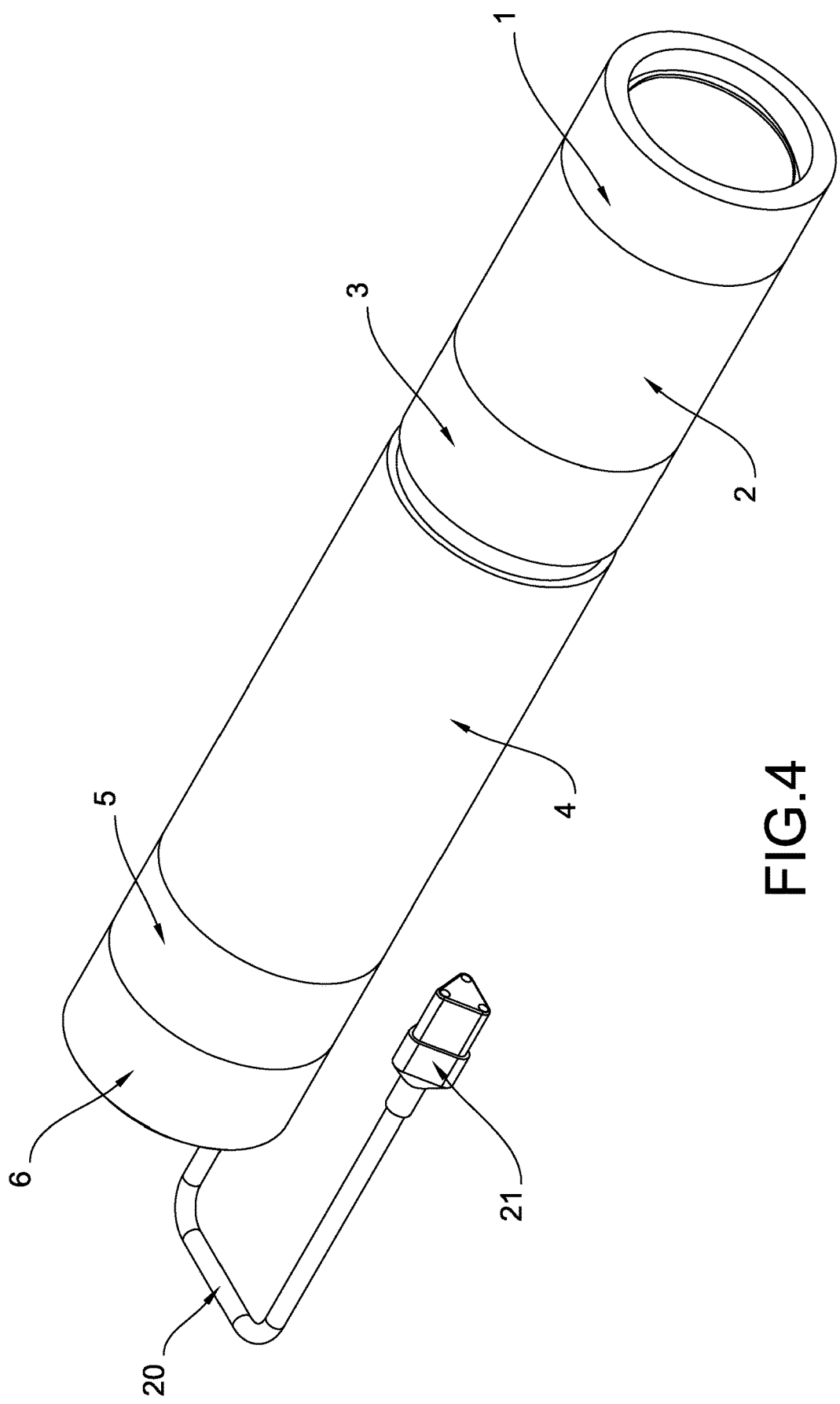
FIG. 4 is a perspective view of a camera-free defocusing measurement collimator of a second preferred embodiment of the invention.
Figure 5:
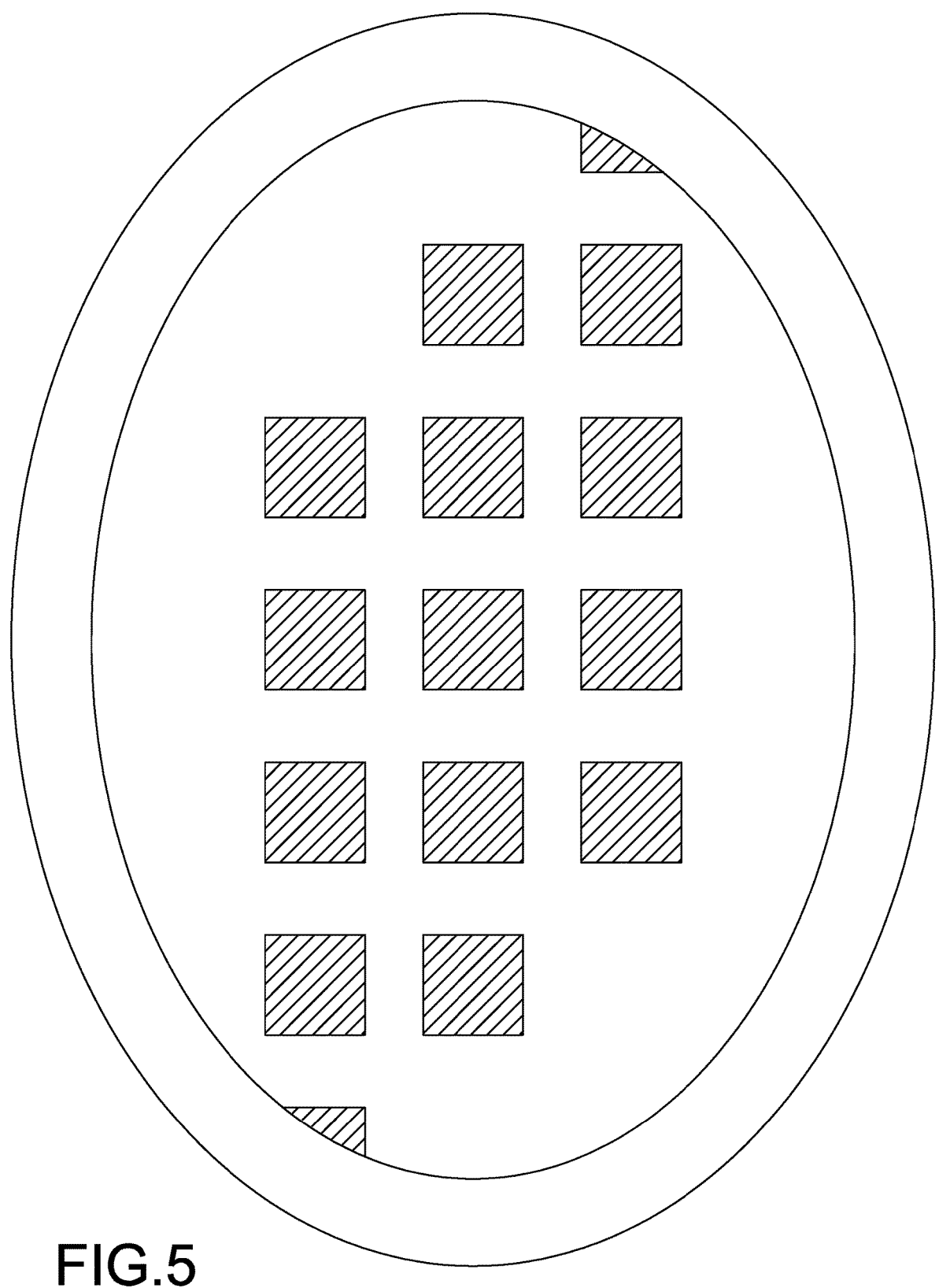
FIG. 5 depicts the tilted test chart of a first configuration.
Figure 6:
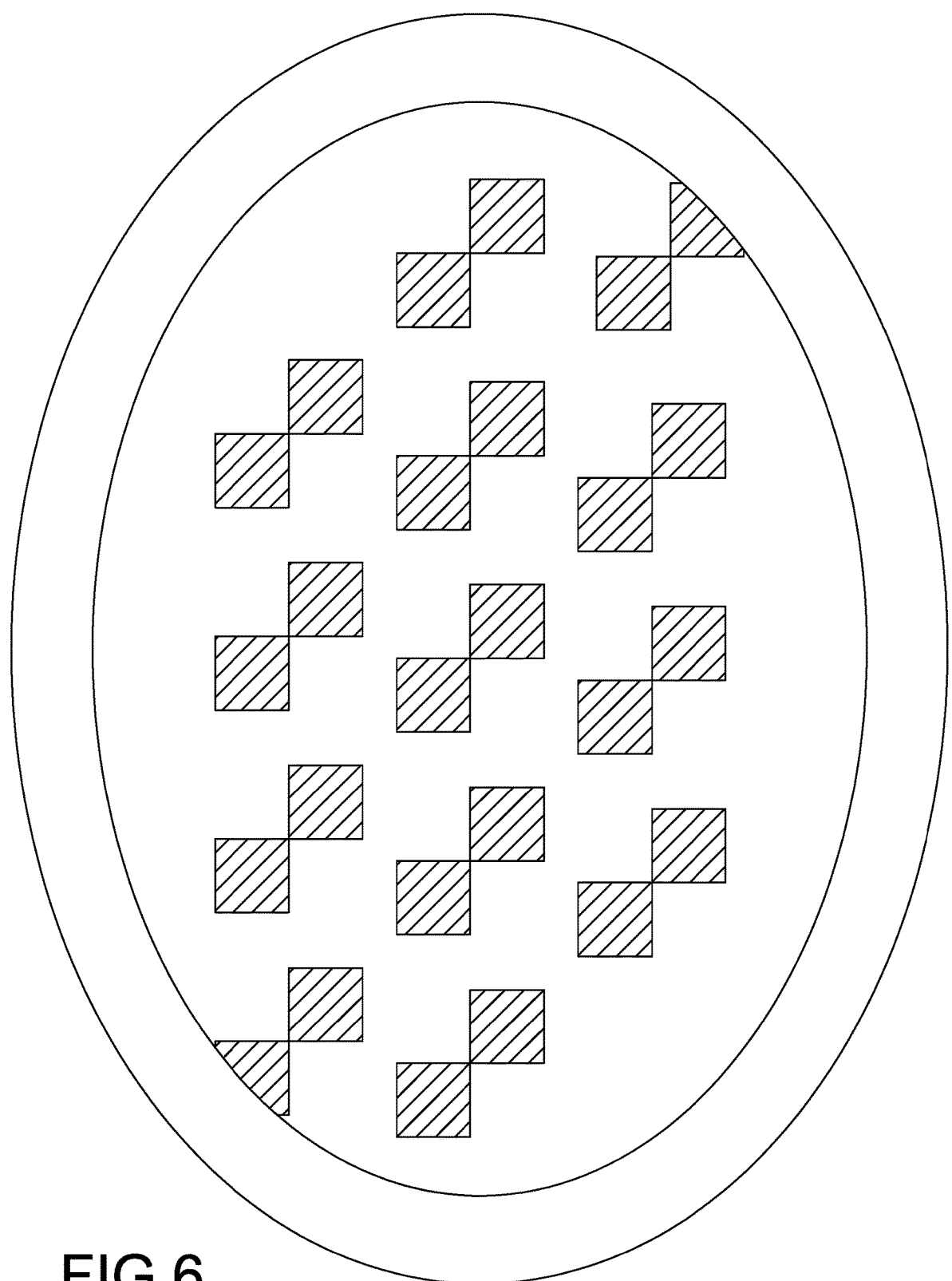
FIG. 6 depicts the tilted test chart of a second configuration.
Figure 7:
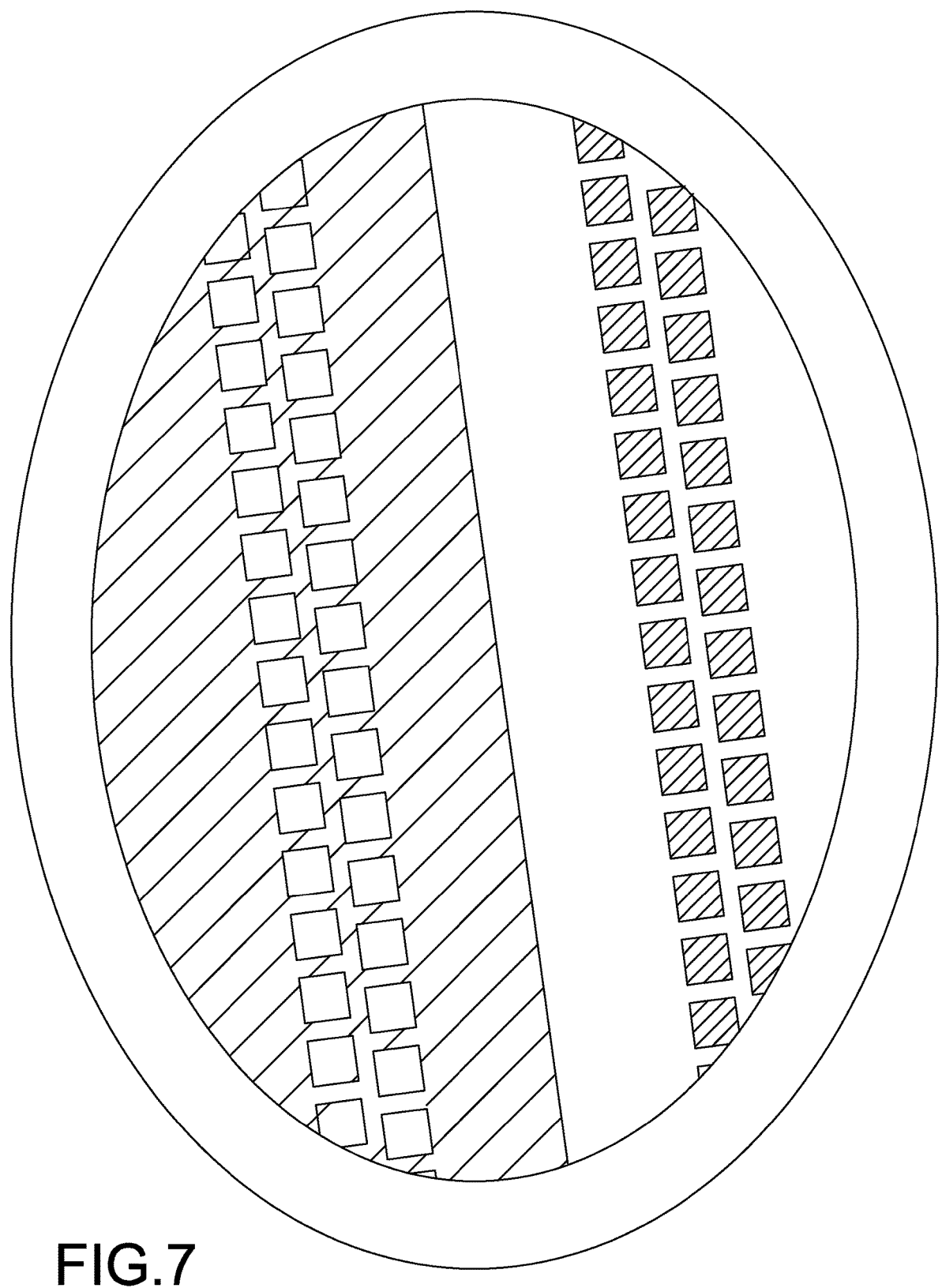
FIG. 7 depicts the tilted test chart of a third configuration.
Figure 8:
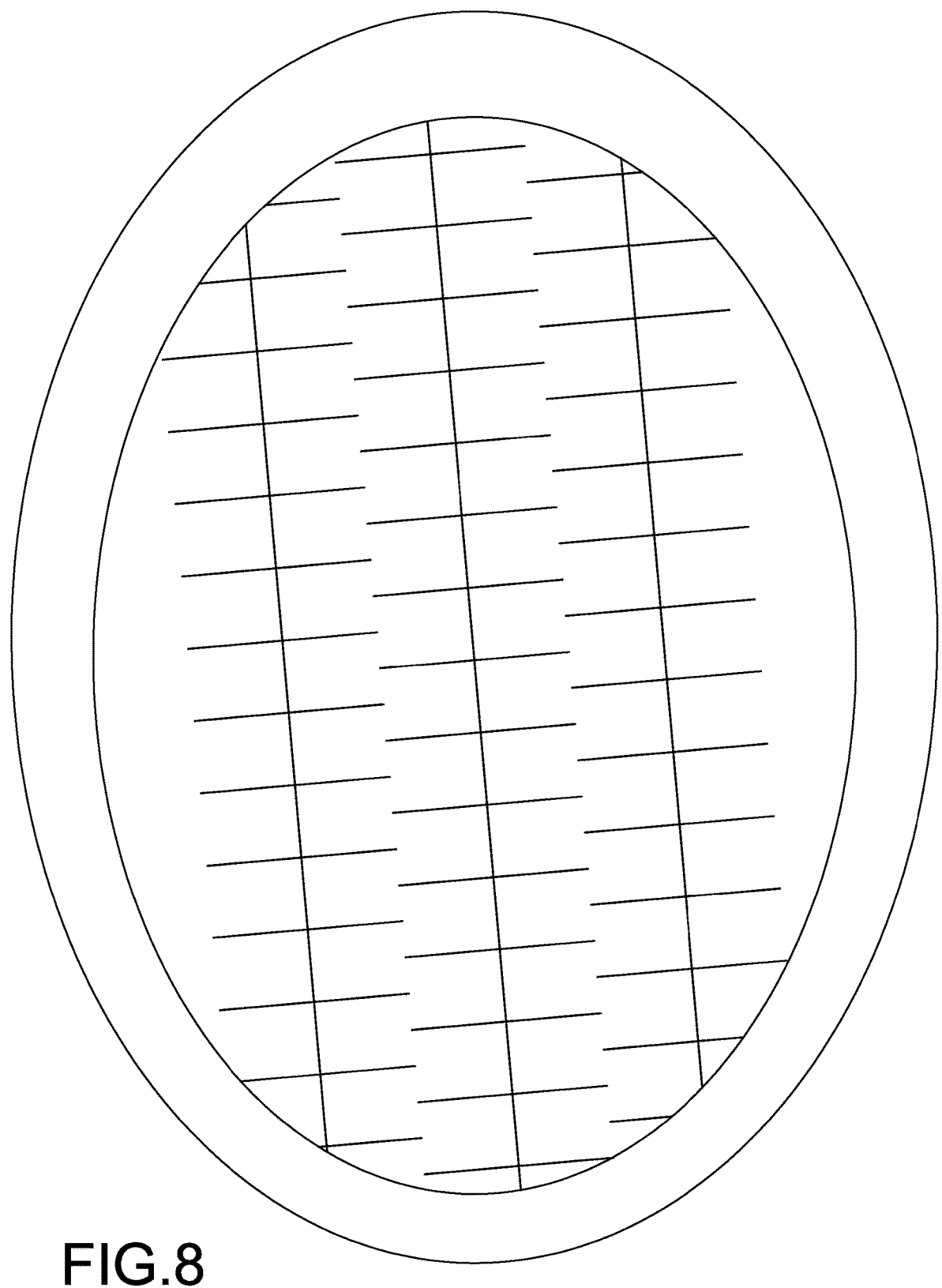
FIG. 8 depicts the tilted test chart of a fourth configuration.

Referring to FIG. 4 in conjunction with FIGS. 1 to 3 and 5 to 8, a camera-free defocusing measurement collimator of a second preferred embodiment of the invention is shown below. A clamping groove 100 is disposed on the surface of the front lens sleeve 1, a linking sleeve 2 is fastened on the surface of the front lens sleeve 1 with the clamping groove 100, a snapping groove 23 is disposed on the side of the linking sleeve 2 far from the front lens sleeve 1, a connection sleeve 3 is slidably connected on the surface of the snapping groove 23, a constraint sleeve 4 is partially disposed on the surface of the snapping groove 23, a limit groove 40 is disposed on the inner surface of the constraint sleeve 4, a limit sleeve 5 is fastened on the inner surface of the constraint sleeve 4 on the limit groove 40, and a tail sleeve 6 is fastened on the inner surface of the limit sleeve 5.

A wire 21 is connected to the inner surface of the tail sleeve 6, and a plug 22 is connected to the input end of the wire 21. A circular hole 24 is disposed on the surface of the end cap 20. The wire 21 urges against the inner surface of the circular hole 24 and runs through the circular hole 24. The LED light source plate 17 is electrically connected with the output end of the wire 21. The wire 21 and plug 22 are used to assemble the device on the processing terminal, while the wire 21 provides power to the device.

The invention has the following advantages and benefits in comparison with the conventional art:

The test chart is placed in a tilted way relative to the optical axis of the lens, and the specially designed test chart makes the special structure pattern of the test chart distributed at different distances along the axis. When using the camera to shoot the collimator, the clarity of different structures can reflect the relative focus position of the camera. Through the special design of the placement angle of the test chart and the one of the test chart structure, when the system is used for measurement, no scanning is required, which greatly improves the measurement speed, and makes the system simple and greatly reduces the cost. In addition, the tilted angle of the test chart and the special structure of the test chart are made according to the calculation result of the camera and lens parameters. The invention facilitates the detection of the vehicle mounted camera, thereby reducing the detection difficulty, and improving the detection efficiency and the detection convenience of the detection device for vehicle mounted camera.

The invention is small in size, and convenient for building mechanism test, and has high universality. Its brightness of the light source can be adjusted to enhance the applicability of the product. LED supplementary lighting is adopted, with stable performance and long service life. The overall product is in a metal structure, which is stable and doesn't deform. In addition, the invention is simple and not complex to use, saving measurement time and improving efficiency. Through the special design of the placement angle of the test chart and the one of the test chart structure, when the system is used for measurement, no scanning is required, which greatly improves the measurement speed, and makes the system simple and greatly reduces the cost. In addition, the tilted angle of the test chart and the special structure of the test chart are made according to the calculation result of the camera and lens parameters.

While the invention has been described in terms of preferred embodiments, those skilled in the art will recognize that the invention can be practiced with modifications within the spirit and scope of the appended claims.

What is claimed is:

1. A scanning camera-free defocusing measurement collimator, comprising:
    a front lens sleeve;
    a clamping groove disposed on the front lens sleeve;
    a linking sleeve fastened on the clamping groove;
    a snapping groove disposed on the linking sleeve distal the front lens sleeve;
    a connection sleeve slidably disposed on the snapping groove;
    a constraint sleeve partially disposed on the snapping groove;
    a limit groove disposed on an inner surface of the constraint sleeve;
    a limit sleeve fastened on the limit groove;
    a tail sleeve fastened on an inner surface of the limit sleeve;
    a positioning ring secured to an inner surface of the front lens sleeve;
    a convex lens secured to the inner surface of the front lens sleeve and urging against the positioning ring from behind; and
    a concave lens secured to the inner surface of the front lens sleeve and urging against the convex lens from behind.

2. The scanning camera-free defocusing measurement collimator of claim 1 wherein the connection sleeve urges against the constraint sleeve, the limit ring is connected to the inner surface of the constraint sleeve, an assembly sleeve urges against the inner surface of the constraint sleeve, and the limit ring urges against the assembly sleeve.

3. The scanning camera-free defocusing measurement collimator of claim 2 further comprising an installation groove disposed on the inner surface of the assembly sleeve, a tilted test chart connected to the inner surface of the assembly sleeve and disposed at an angle of 45-degree wherein a tilt spacing of the tilted test chart is 2 mm, and a sealing ring connected to the inner surface of the constraint sleeve wherein the assembly sleeve urges against the sealing ring.

4. The scanning camera-free defocusing measurement collimator of claim 3 further comprising a light source lens secured to the inner surface of the limit sleeve wherein the constraint sleeve urges against an inner surface of the limit sleeve, an LED light source plate secured to the inner surface of the limit sleeve, a binding ring secured to the inner surface of the limit sleeve, and an isolation groove connected to the binding ring.

5. The scanning camera-free defocusing measurement collimator of claim 4 wherein the constraint sleeve urges against the light source lens, the LED light source plate urges against the constraint sleeve, the constraint ring urges against the LED light source plate, and the isolation groove urges against the inner surface of the limit sleeve.

6. The scanning camera-free defocusing measurement collimator of claim 5 further comprising an end cap fastened on the inner surface of the tail sleeve, and wherein the tail sleeve urges against the isolation groove.

7. The scanning camera-free defocusing measurement collimator of claim 6 further comprising a circular hole disposed through the end cap.

8. The scanning camera-free defocusing measurement collimator of claim 6 further comprising a wire connected to the inner surface of the tail sleeve, and a plug electrically connected to the wire.

9. The scanning camera-free defocusing measurement collimator of claim 8 further comprising a circular hole disposed through of the end cap wherein the wire urges against an inner surface of the circular hole and passes through the circular hole.

10. The scanning camera-free defocusing measurement collimator of claim 8 wherein the LED light source plate is electrically connected to the wire.

* * * * *